US010047667B2

(12) United States Patent
So et al.

(10) Patent No.: US 10,047,667 B2
(45) Date of Patent: Aug. 14, 2018

(54) APPARATUS AND METHOD FOR REDUCING FLOW NOISE IN A COMMERCIAL ENGINE VEHICLE

(71) Applicant: HYUNDAI MOTOR COMPANY, Seoul (KR)

(72) Inventors: Hyun Kee So, Gunpo-si (KR); Jae Gab Lee, Gyeongsangnam-do (KR)

(73) Assignee: Hyundai Motor Company, Seoul (KR)

( * ) Notice: Subject to any disclaimer, the term of this patent is extended or adjusted under 35 U.S.C. 154(b) by 112 days.

(21) Appl. No.: 15/395,631

(22) Filed: Dec. 30, 2016

(65) Prior Publication Data

US 2018/0106188 A1   Apr. 19, 2018

(30) Foreign Application Priority Data

Oct. 18, 2016   (KR) .......................... 10-2016-0134892

(51) Int. Cl.
| | |
|---|---|
| *F02B 39/16* | (2006.01) |
| *F02B 37/18* | (2006.01) |
| *F02D 41/00* | (2006.01) |

(52) U.S. Cl.
CPC ............ *F02B 39/16* (2013.01); *F02B 37/183* (2013.01); *F02D 41/0007* (2013.01); *F02D 2200/602* (2013.01)

(58) Field of Classification Search
CPC .... F02B 39/16; F02B 37/183; F02D 41/0007; F02D 2200/602
USPC .......................... 60/602, 605.1, 605.2, 605.3
See application file for complete search history.

(56) References Cited

U.S. PATENT DOCUMENTS

| | | | | |
|---|---|---|---|---|
| 4,597,264 | A * | 7/1986 | Cipolla | F02B 37/186 60/602 |
| 5,249,484 | A * | 10/1993 | Matsuoka | B60W 30/18 477/121 |
| 6,810,667 | B2 * | 11/2004 | Jung | F02B 37/16 123/559.1 |
| 2005/0001480 | A1 * | 1/2005 | Tabata | F02D 11/105 303/141 |
| 2009/0183507 | A1 * | 7/2009 | Weaver | F02B 37/186 60/602 |
| 2012/0237367 | A1 * | 9/2012 | Cunningham | F04F 5/20 417/55 |

FOREIGN PATENT DOCUMENTS

| | | |
|---|---|---|
| JP | 1069135 U1 | 5/1989 |
| JP | H08151929 | 6/1996 |
| JP | H09287463 | 11/1997 |

(Continued)

*Primary Examiner* — Hoang Nguyen
(74) *Attorney, Agent, or Firm* — Lempia Summerfield Katz LLC

(57) ABSTRACT

An apparatus for reducing flow noise in a commercial engine vehicle includes an actuator into which first compressed air generated according to operation of an accelerator pedal and second pressed air generated from an air tank of a vehicle are selectively introduced. The apparatus also includes a lift plate moving up and down in the actuator by a pressure of the first or second compressed air introduced thereinto. The apparatus also includes a waste gate valve operated by a pressure according to the up and down movement of the lift plate in the actuator, in order to bypass exhaust gas in a turbine when the waste gate valve is opened.

8 Claims, 3 Drawing Sheets

(56) References Cited

FOREIGN PATENT DOCUMENTS

| | | |
|---|---|---|
| JP | 2014-238034 A | 12/2014 |
| JP | 2015094313 | 5/2015 |
| KR | 10-2004-0097606 A | 11/2004 |
| KR | 1020050068650 | 7/2005 |
| KR | 10-0559899 B1 | 3/2006 |
| KR | 10-2006-0068725 | 6/2006 |
| KR | 10-1013966 B1 | 2/2011 |

* cited by examiner

APPARATUS AND METHOD FOR REDUCING FLOW NOISE IN A COMMERCIAL ENGINE VEHICLE

CROSS-REFERENCE TO RELATED APPLICATION

This application claims under 35 U.S.C. § 119(a) the benefit of priority to Korean Patent Application No. 10-2016-0134892 filed on Oct. 18, 2016, the entire contents of which are incorporated herein by reference.

BACKGROUND

(a) Technical Field

The present disclosure relates to an apparatus and method for reducing flow noise in a commercial engine vehicle. More particularly, it relates to an apparatus and method for reducing flow noise in a commercial engine vehicle using an air compressor provided in a commercial diesel engine.

(b) Background Art

In recent years, a constant pressure-type Waste Gate Turbocharger (WGT) has been increasingly used rather than a Variable Geometry Turbocharger (VGT) in a commercial engine in order to ensure a competitive price and reduce costs.

In a typical diesel engine vehicle, when an accelerator pedal is released while the vehicle is traveling, the flow separation of gas occurs while exhaust gas passes through the turbine of a turbocharger. This flow separation of gas exits an overall exhaust system, resulting in surge noise and flow noise.

In a passenger diesel engine, the method of tuning the opening degrees of a resonator and a VGT is performed to reduce noise. Optimally mapping an engine management system (EMS) in the rear end of a turbine is also performed to reduce noise. However, unlike vehicles equipped with VGTs and negative pressure-type WGTs, there is a limitation in reducing noise in a commercial engine vehicle equipped with a constant pressure-type WGT.

In other words, since the constant pressure-type WGT is operated only when the pressure in the turbocharger is higher than a certain pressure, it is difficult to reduce noise by tuning the opening degree of the WGT and mapping the EMS.

To this end, in a commercial engine, a method of reinforcing catalyst insulation or applying an orifice is currently performed to reduce noise. However, the reinforcement of the catalyst insulation may lead to an excessive increase in costs, and the application of an orifice may be a major obstacle to performance and EMS development.

The above information disclosed in this Background section is only for enhancement of understanding of the background of the disclosure and therefore it may contain information that does not form the prior art.

Korean Patent Laid-open Publication No. 10-2006-0068725 (Jun. 21, 2006) discloses an example of a prior art attempt at noise reduction.

SUMMARY OF THE DISCLOSURE

The present disclosure has been made in an effort to solve the above-described problems associated with the prior art.

In one aspect, the present disclosure provides an apparatus and method for reducing flow noise in a commercial engine vehicle. The method which is capable of reducing exhaust flow noise generated when an accelerator pedal is released after being depressed. The apparatus and method for reducing flow noise operates by opening a valve to supply compressed air to an actuator through an air compressor when the accelerator pedal is released, such that the actuator is operated to bypass exhaust gas and so that the exhaust pressure in a turbine is lowered.

In an embodiment, an apparatus for reducing flow noise in a commercial engine vehicle includes an actuator into which first compressed air generated according to operation of an accelerator pedal and second compressed air generated from an air tank pre-installed in a commercial engine are selectively introduced. The apparatus and method for reducing flow noise also includes a lift plate moving up and down in the actuator by a pressure of the first or second compressed air introduced thereinto. The apparatus and method for reducing flow noise also includes a waste gate valve operated by a pressure according to the upward and downward movement of the lift plate in the actuator in order to bypass exhaust gas in a turbine when the waste gate valve is opened.

The lift plate may include a first plate installed in a first passage, which maybe one of a number of passages partitioned within the actuator. The first plate moves up and down in the first passage by the pressure of the first compressed air introduced when the accelerator pedal is operated or depressed. A second plate may be installed in a second passage separated from the first passage within the actuator. The second plate moves up and down in the second passage by the pressure of the second compressed air introduced from the air tank when the accelerator pedal is not operated or is released after being depressed.

The actuator may include a control valve installed on a connection passage that is branched from the second passage and is connected to the air tank. The actuator functions to control opening and closing of the connection passage such that the second compressed air generated from the air tank selectively flows along the second passage.

The actuator may include a vibration absorption member installed on a lower portion of the lift plate. The vibration absorption member serves to absorb vibration due to the upward and downward movement of the lift plate. The actuator may also include a shock absorption member fixedly disposed while being spaced apart from the vibration absorption member. The shock absorption member serves to absorb shock due to a collision with the vibration absorption member when the lift plate moves up and down.

The second compressed air may be introduced into the actuator through a connection passage connected to the air tank when the accelerator pedal is not operated or is released. The first compressed air may be introduced into the actuator through an inflow passage branched from the connection passage when the accelerator pedal is operated or depressed.

In another embodiment, a method of reducing flow noise in a commercial engine vehicle includes determining whether an accelerator pedal is in an off state by comparing a preset accelerator pedal signal value with an actual accelerator pedal signal value. The method includes transmitting an operation signal to a control valve from a controller so as to open the control valve when the accelerator pedal is determined to be in the off state. The method includes selectively opening a waste gate valve by moving a lift plate in an upward or downward direction by a pressure of compressed air introduced into an actuator from an air tank pre-installed outside the actuator through the opening of the control valve.

In the step of transmitting of an operation signal to a control valve from a controller, when the accelerator pedal is determined to be in an on state, the controller may transmit a signal for blocking the opening of the control valve and cause the waste gate valve to be opened by compressed air introduced when the accelerator pedal is operated or depressed.

In the step of transmitting of an operation signal to a control valve from a controller, the controller may also transmit the operation signal to the control valve for a preset time and stop the transmission of the operation signal after the preset time in order to block the opening of the control valve.

Other aspects and embodiments of the disclosure are discussed below. It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present disclosure will now be described in detail with reference to certain embodiments thereof illustrated the accompanying drawings which are given hereinbelow by way of illustration only, and thus are not limitative of the present disclosure, and wherein.

Figure 1:
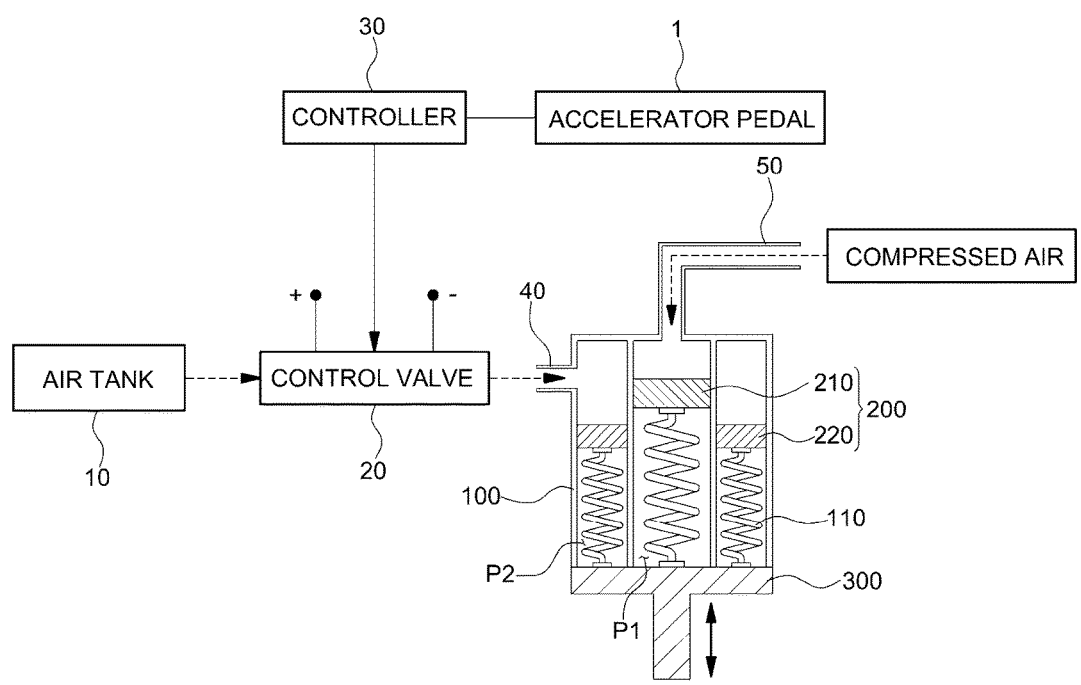
FIG. 1 is a diagram illustrating an apparatus for reducing flow noise in a commercial engine vehicle according to a first embodiment of the present disclosure.

It should be understood that the appended drawings are not necessarily to scale, presenting a representation of various features illustrative of the principles of the disclosure. The specific design features of the present disclosure as disclosed herein, including, for example, specific dimensions, orientations, locations, and shapes will be determined in part by the intended application and use environment.

In the figures, reference numbers refer to the same or equivalent parts of the present disclosure throughout the several figures of the drawing.

DETAILED DESCRIPTION

Hereinafter, reference will now be made to various embodiments of the present disclosure, which are illustrated in the accompanying drawings and described below.

Other advantages and features of the present disclosure can be understood by the following description and will become apparent to those having ordinary skill in the art with reference to the embodiments of the present disclosure.

While the disclosure will be described in conjunction with embodiments, it will be understood that present description is not intended to limit the disclosure to those embodiments. On the contrary, the disclosure is intended to cover not only the embodiments, but also various alternatives, modifications, equivalents, and other embodiments, which may be included within the spirit and scope of the disclosure as defined by the appended claims.

In certain embodiments, detailed descriptions of relevant constructions or functions well known in the art may be omitted to avoid obscuring appreciation of the disclosure.

FIG. 1 is a diagram illustrating an apparatus for reducing flow noise in a commercial engine vehicle according to a first embodiment of the present disclosure.

As illustrated in FIG. 1, the apparatus for reducing flow noise in a commercial engine vehicle according to the present embodiment includes an actuator 100, a lift plate 200, and a waste gate valve 300.

The actuator 100 is configured such that first compressed air generated according to the operation or depressing of an accelerator pedal to selectively introduce into the actuator 100. Second compressed air generated from an air tank 10 is also selectively introduced into the actuator 100. The air tank 10 may be pre-installed in a commercial engine, or may more particularly be provided by an air compressor.

The lift plate 200 moves up and down in the actuator 100 by the pressure of the first or second compressed air introduced into the actuator 100.

The lift plate 200 according to this embodiment includes first and second plates 210 and 220, which may move up and down to different degrees according to the inflow path of the first or second compressed air in the actuator 100.

The first plate 210 is installed in a first passage P1, which is one of a number of passages partitioned within the actuator 100. When the first compressed air is introduced into the first passage P1 at a pressure equal to or higher than a specific pressure, i.e. about 2.5 bar, the first plate 210 moves up and down in the first passage P1 by the pressure of the first compressed air.

The second plate 220 is installed in a second passage P2, which is separated from the first passage P1 within the actuator 100. The second plate 220 moves up and down in the second passage P2 by the pressure of the second compressed air introduced from the air tank 10 when the accelerator pedal is not operated.

In other words, the second plate 220 is installed in the second passage P2, which is formed outside the first passage P1 formed in the central portion of the actuator 100. The second plate 200 moves up and down, independently of the first plate 210, by the pressure of the second compressed air generated from the air tank 10 when the accelerator pedal is not operated or is released.

To this end, the actuator 100 includes a control valve 20 installed on a connection passage 40. The connection passage 40 is branched from the second passage P2 and is connected to the air tank 10. The control valve 20 controls the opening and closing of the connection passage 40 such that the second compressed air generated from the air tank 10 selectively flows toward the second passage P2.

When a signal according to the non-operation or release of the accelerator pedal is transmitted from a controller 30, namely an engine control unit (ECU), to the control valve 20, the control valve 20 is opened for the supply of the second compressed air. For example, in a commercial engine vehicle equipped with a constant pressure-type WGT, when an accelerator pedal is released while the vehicle is traveling, the flow separation of gas occurs while exhaust gas passes through the turbine of a turbocharger. This flow separation of gas exits an overall exhaust system, resulting in surge noise and flow noise. Accordingly, in order to reduce the generation of surge noise and flow noise, the control valve 20 is opened such that the second compressed air generated from the air tank 10 is introduced into the actuator 100 even when the accelerator pedal has been released or is not operated.

In more detail, the constant pressure-type WGT is operated only when the pressure in the turbocharger is equal to or higher than a certain pressure. In this case, when the accelerator pedal is not operated, the pressure in the turbocharger is low. Therefore, the control valve 20 is opened such that the second compressed air is supplied from the pre-installed air tank 10 to the actuator 100 even when the accelerator pedal has been released or is not operated, thereby reducing the generation of flow noise.

In this embodiment, unlike the first plate 210 moving by a specific pressure of 2.5 bar of the first compressed air, the second plate 220 moves up and down by a pressure of about 8 to 9 bar of the second compressed air generated from the air tank 10. In this instance, the second plate 220 may move up and down to the same degree as the first plate 210 by increasing the number of elastic members 110 installed for connection with the waste gate valve 300 in the second passage P2.

Meanwhile, the waste gate valve 300 is connected to the lift plate 200, i.e. the first and second plates 210 and 220, through the elastic members 110 in the lower portion of the actuator 100. The waste gate valve 300 is operated by a pressure according to the upward and downward movement of the lift plate. When the first compressed air and the second compressed air are introduced into the actuator 100, the waste gate valve 300 is opened to bypass exhaust gas in the turbine.

Ultimately, the waste gate valve 300 is opened when the first compressed air and the second compressed air are selectively introduced into the actuator 100 in order to bypass exhaust gas in the turbine. The result that the generation of flow noise may be reduced even when the accelerator pedal is released or is not operated.

Figure 2:
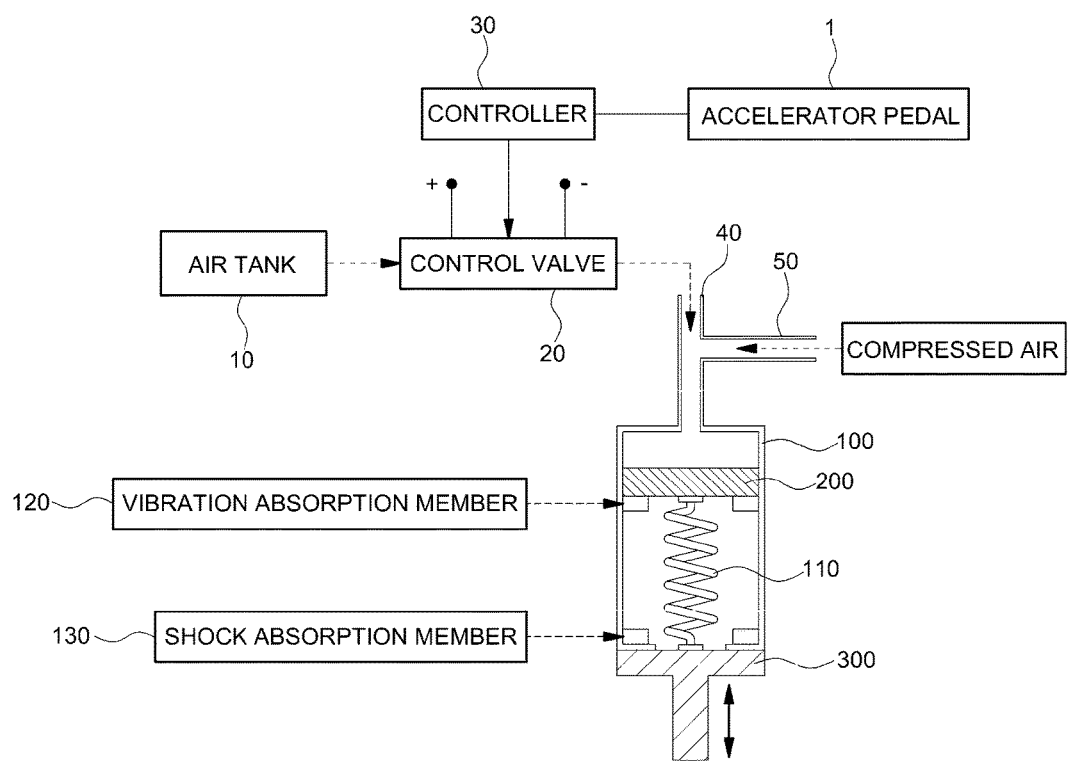
FIG. 2 is a diagram illustrating an apparatus for reducing flow noise in a commercial engine vehicle according to a second embodiment of the present disclosure.

FIG. 2 is a diagram illustrating an apparatus for reducing flow noise in a commercial engine vehicle according to a second embodiment of the present disclosure.

As illustrated in FIG. 2, the apparatus for reducing flow noise in a commercial engine vehicle according to the present embodiment includes an actuator 100, a lift plate 200, and a waste gate valve 300.

The configuration of the actuator 100, the lift plate 200, and the waste gate valve 300 according to the present embodiment depicted in FIG. 2 relates to that of the first embodiment depicted in FIG. 1. See the above detailed description of the actuator 100, the lift plate 200, and the waste gate valve 300 in relation to the present embodiment.

In this embodiment, the actuator 100 includes a vibration absorption member 120 and a shock absorption member 130 in order to prevent damage due to a collision between the lift plate 200 and the waste gate valve 300 by the pressure of the first compressed air introduced into the actuator 100 from the air tank 10.

In other words, the first compressed air generated according to the operation of the accelerator pedal is introduced into the actuator 100 through an inflow passage 50 branched from the connection passage 40. In this case, the first compressed air is introduced into the actuator 100 at a specific pressure, i.e. a pressure of about 2.5 bar, and thus the lift plate 200 moves up and down.

However, when the control valve 20 is opened according to checking that the accelerator pedal has been released or is not operated, the second compressed air generated from the air tank 10 is introduced, at a pressure of about 8 to 9 bar, into the actuator 100 through the connection passage 40 connected to the air tank 10, unlike the pressure of the first compressed air. Hence, when the lift plate 200 moves up and down by the introduction of the second compressed air, the lift plate 200 may collide with the waste gate valve 300 due to the vertical speed of the lift plate, which may lead to problems such as damage to the components.

To this end, the vibration absorption member 120 is installed on the lower portion of the lift plate 200, and absorbs vibration caused due to the upward and downward movement of the lift plate 200.

The vibration absorption member 120 has a ring shape and is installed on the lower portion of the lift plate 200 so as to come into contact with the inner surface of the actuator 100. Thus, when the lift plate 200 moves up and down by the introduction of the second compressed air, the vibration absorption member 120 serves to provide frictional force and absorb vibration, thereby enabling the vertical speed of the lift plate 200 to be restricted.

The shock absorption member 130 is spaced apart from the vibration absorption member 120 and is fixedly disposed in the actuator 100. The shock absorption member 130 serves to absorb shock due to a collision with the vibration absorption member 120 when the lift plate 200 moves up and down.

The shock absorption member 130 is installed to prevent damage due to a collision when the lift plate 200 moves up and down by the second compressed air. Preferably, the shock absorption member 130 consists of an elastic member such as rubber in order to efficiently absorb shock, and is made of a heat resistant material in order to endure frictional heat caused due to the upward and downward movement of the lift plate 200.

Ultimately, the apparatus for reducing flow noise in a commercial engine vehicle according to the present embodiment includes the vibration absorption member 120 and the shock absorption member 130. The lift plate 200, thus moves up and down to the same degree when the second compressed air is introduced into and the first compressed air is introduced into the actuator. Consequently, the waste gate valve 300 may be stably operated to bypass exhaust gas in the turbine, thereby efficiently reducing flow noise in the commercial engine vehicle.

Figure 3:
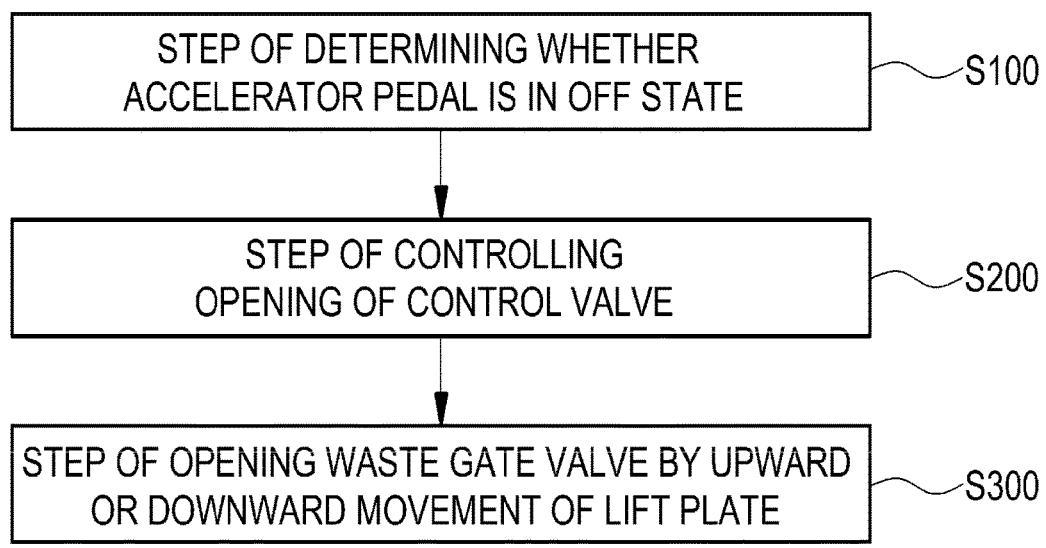
FIG. 3 is a flowchart illustrating a method of reducing flow noise in a commercial engine vehicle according to a third embodiment of the present disclosure.

FIG. 3 is a flowchart illustrating a method of reducing flow noise in a commercial engine vehicle according to a third embodiment of the present disclosure. Hereinafter, the method of reducing flow noise in a commercial engine vehicle will be sequentially described with reference to FIG. 3.

Whether an accelerator pedal 1 is in an off or released state is determined by comparing a preset accelerator pedal signal value with an actual accelerator pedal signal value (S100).

When the on/off signal of the accelerator pedal 1 is transmitted to a controller 30 and the controller 30 determines that the accelerator pedal 1 is in the off or released state, i.e. the controller 30 determines that a driver's foot has been released from depressing the accelerator pedal 1 based on the on/off signal, the controller 30 transmits an operation signal for opening a control valve 20 and causes the control valve 20 to be opened (S200).

Thus, when compressed air is introduced into an actuator 100 from an air tank 10, which is pre-installed outside the actuator 100, according to the opening of the control valve 20, a lift plate 200 moves up or down by the pressure of the compressed air so that a waste gate valve 300 is selectively opened (S300).

In this case, when the accelerator pedal 1 is determined to be in an on state, i.e., when it is determined that the driver presses the accelerator pedal 1, the controller 30 transmits a signal for blocking the opening of the control valve 20. Thus, the waste gate valve 300 is opened by compressed air introduced when the accelerator pedal 1 is operated.

In this embodiment, the controller 30 transmits an operation signal for controlling the opening of the control valve 20 for a preset time. The controller 30 stops the transmission of the operation signal after the preset time in order to block the opening of the control valve 20.

In other words, the opening of the control valve 20 enables the actuator 100 to be operated so that the waste gate valve 300 is operated to bypass exhaust gas in the turbine. Accordingly, it is necessary to open the control valve 20 only for a time required to bypass exhaust gas without a need to continuously open the control valve 20. Therefore, the opening of the control valve 20 is preferably blocked without separate control for blocking after the preset time.

Ultimately, when the accelerator pedal 1 is not operated or released, compressed air is introduced into the actuator 100 using the pre-installed air tank 10 and exhaust gas in the turbine is bypassed by the operation of the actuator 100 in the embodiments. Therefore, it is possible to efficiently reduce the generation of flow noise in the structure in which the pressure in the turbocharger, e.g. a constant pressure-type WGT, is equal to or higher than a certain pressure.

In the present disclosure, it is possible to reduce exhaust flow noise generated when the accelerator pedal is not operated or released, by opening the valve to supply compressed air to the actuator through the air compressor when the accelerator pedal is not operated, so that the actuator is operated to bypass exhaust gas and so that the exhaust pressure in the turbine is lowered.

In addition, it is possible to reduce costs because of removing many members for reinforcing an orifice and removing a catalyst insulation which may have been applied to reduce exhaust flow noise.

According to the above description, the present disclosure has an effect of reducing exhaust flow noise generated when an accelerator pedal is not operated or released, by opening a valve to supply compressed air to an actuator through an air compressor when the accelerator pedal is not operated or released, so that the actuator is operated to bypass exhaust gas and the exhaust pressure in a turbine is lowered.

The present disclosure has an effect of reducing costs because of removing many members for reinforcing an orifice and removing a catalyst insulation which may have been applied to reduce exhaust flow noise.

The disclosure has been described in detail with reference to embodiments thereof. However, it will be appreciated by those skilled in the art that changes may be made in these embodiments without departing from the principles and spirit of the disclosure, the scope of which is defined in the appended claims and their equivalents.

What is claimed is:

1. An apparatus for reducing flow noise in a vehicle, the apparatus comprising:
    an actuator configured to receive first compressed air generated according to operation of an accelerator pedal and second compressed air generated from an air tank of the vehicle;
    a lift plate configured to move up and down in the actuator by a pressure of the first or second compressed air introduced into the actuator; and
    a waste gate valve operable by a pressure according to the up and down movement of the lift plate in the actuator, in order to bypass exhaust gas in a turbine when the waste gate valve is opened.

2. The apparatus of claim 1, wherein the lift plate comprises:
    a first plate installed in a first passage within the actuator, the first plate configured to move up and down in the first passage by the pressure of the first compressed air introduced when the accelerator pedal is depressed; and
    a second plate installed in a second passage separated from the first passage within the actuator, the second plate configured to move up and down within the second passage by the pressure of the second compressed air received from the air tank when the accelerator pedal is released.

3. The apparatus of claim 2, wherein the actuator comprises a control valve installed on a connection passage that is branched from the second passage and is configured to connect to the air tank so as to control opening and closing of the connection passage such that the second compressed air generated from the air tank selectively flows along the second passage.

4. The apparatus of claim 1, wherein the actuator comprises:
    a vibration absorption member installed on a lower portion of the lift plate, and serving to absorb vibration due to the up and down movement of the lift plate; and
    a shock absorption member fixedly disposed while being spaced apart from the vibration absorption member, and serving to absorb shock due to a collision with the vibration absorption member when the lift plate moves up and down.

5. The apparatus of claim 4, wherein:
    the second compressed air is introduced into the actuator through a connection passage configured to connect to the air tank when the accelerator pedal is released; and
    the first compressed air is introduced into the actuator through an inflow passage branched from the connection passage when the accelerator pedal is depressed.

6. A method of reducing flow noise in a vehicle, the method comprising:
    determining whether an accelerator pedal is in an off state by comparing a preset accelerator pedal signal value with an actual accelerator pedal signal value;
    transmitting an operation signal to a control valve from a controller so as to open the control valve, when the accelerator pedal is determined to be in the off state; and
    selectively opening a waste gate valve by moving a lift plate in an upward or downward direction by a pressure of compressed air introduced into an actuator from an air tank of the vehicle through the opening of the control valve.

7. The method of claim 6, wherein, in the transmitting of an operation signal to a control valve from a controller, when the accelerator pedal is determined to be in an on state, the controller transmits a signal for blocking the opening of the control valve and causes the waste gate valve to be opened by compressed air introduced when the accelerator pedal is depressed.

8. The method of claim 6, wherein, in the transmitting of an operation signal to a control valve from a controller, the controller transmits the operation signal to the control valve for a preset time, and stops the transmission of the operation signal after the preset time in order to block the opening of the control valve.

* * * * *